United States Patent [19]

Van Cuyk

[11] Patent Number: 5,052,203
[45] Date of Patent: Oct. 1, 1991

[54] LOCK FOR TRUCK TRAILERS

[76] Inventor: Donald E. Van Cuyk, 229 Darboy Rd., Combined Locks, Wis. 54113

[21] Appl. No.: 461,531

[22] Filed: Jan. 5, 1990

[51] Int. Cl.⁵ .............................................. F16B 41/00
[52] U.S. Cl. ...................................................... 70/232
[58] Field of Search ................. 70/232, 231, 229, 428, 70/424

[56] References Cited

U.S. PATENT DOCUMENTS 2,785,564  3/1957  Rossi ..................................... 70/232
4,876,867  10/1989  Leneave ................................ 70/428

Primary Examiner—Robert L. Wolfe
Attorney, Agent, or Firm—Michael, Best & Friedrich

[57] ABSTRACT

A lock apparatus for use with a fifth wheel plate having a king pin characterized by an annular groove including a generally cylindrical cup adapted to enclose the king pin, the cup having a transversely extending slot which is registerable with the annular groove, bar means connected to the cup for selective registry with the slot and engagement with the groove, and locking means for locking the bar means into engagement with the groove.

7 Claims, 1 Drawing Sheet

U.S. Patent
Oct. 1, 1991
5,052,203
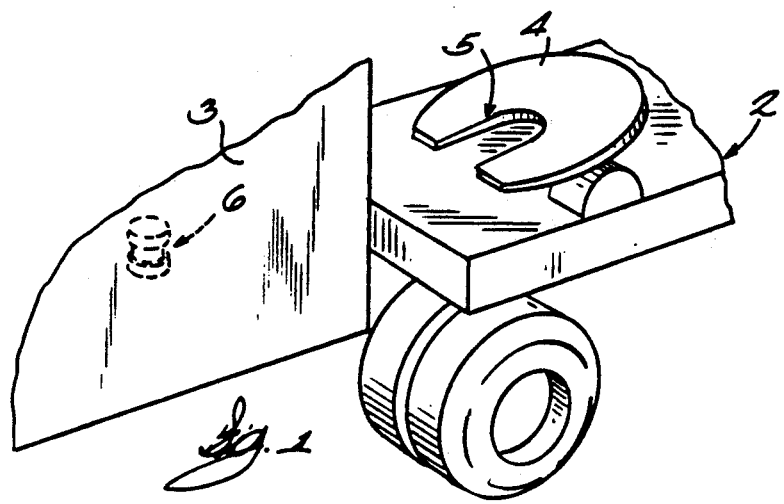
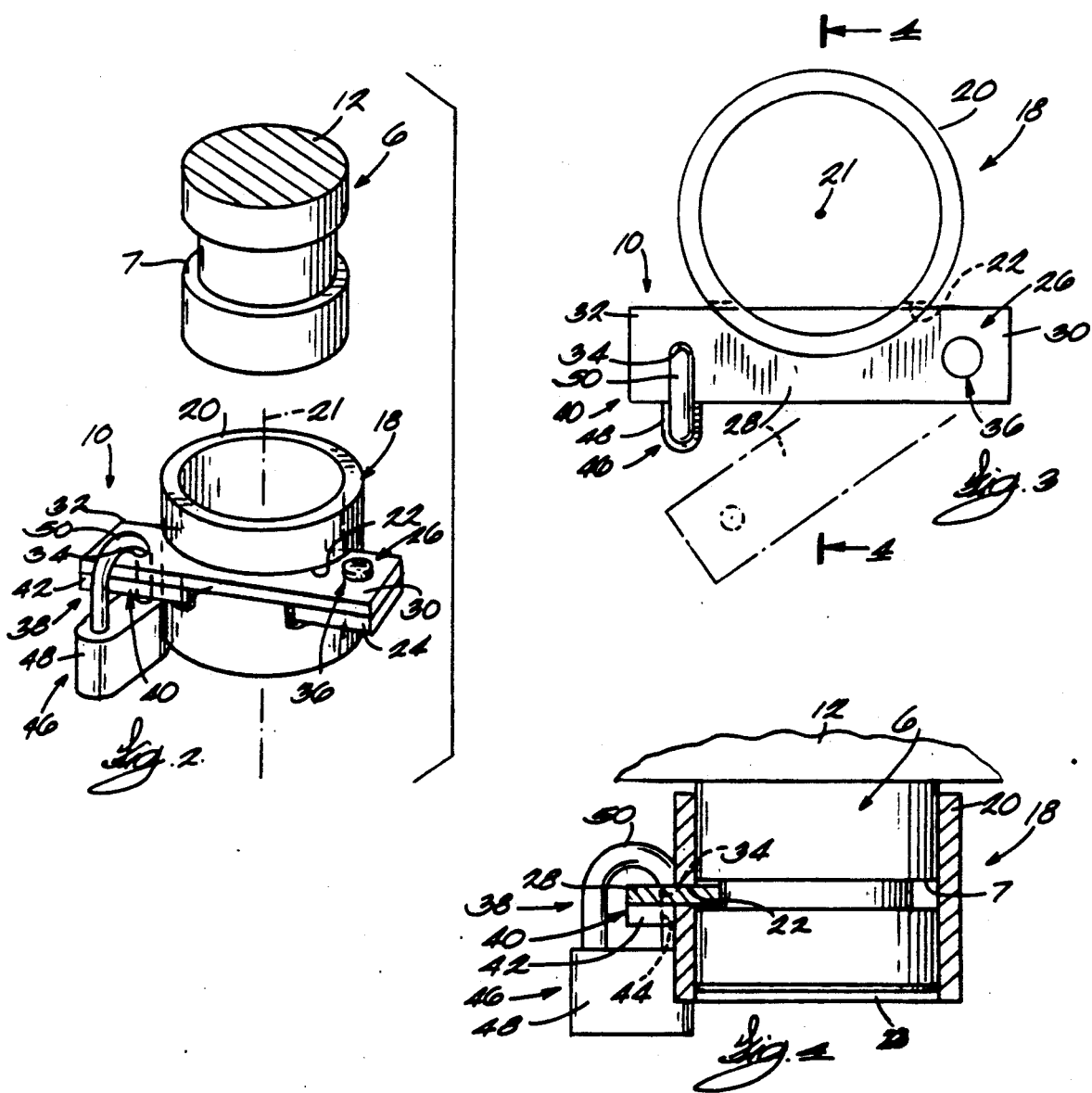

LOCK FOR TRUCK TRAILERS

BACKGROUND OF THE INVENTION

The invention relates to anti-theft locking arrangements, and more particularly to locking arrangements for prevention of the unauthorized coupling of truck tractors and truck trailers.

The standard mechanism used to couple truck tractors and trailers includes a fifth-wheel mounted on the truck tractor and a king-pin mounted on the trailer. Typically, the king-pin extends downwardly from the trailer and has an annular groove located around the outer surface of the king-pin. The fifth-wheel has a slot or a set of jaws which are adapted to engage the grooved king-pin.

The trucking industry has standardized the coupling mechanism between truck tractors and trailers allowing any tractor having a fifth-wheel to engage any trailer having a fifth-wheel. A problem associated with the convenience of standardization, however, is the theft of trailers. Because one practice of the trucking industry is to leave trailers in unprotected parking areas for pick up by truck tractors, standardization of tractor-trailer couplings has facilitated the theft of trailers. A thief having a truck tractor equipped with a standardized fifth-wheel can couple the truck tractor with an unattended trailer and drive away with the trailer and its contents.

Various locking arrangements for the prevention of unauthorized coupling of a fifth-wheel of a tractor to the king-pin of a trailer have been developed. Prior locking arrangements have had the undesirable characteristics of being excessively heavy or ineffective. Additionally, prior locking arrangements have embodied relatively complex designs which are relatively expensive to produce.

SUMMARY OF THE INVENTION

It is an object of the invention to provide a protective enclosure for the king-pin which prevents the unauthorized coupling of a truck tractor with a trailer.

It is a further object of the invention to provide such a locking arrangement having a simple design and a minimum of moving parts.

The invention provides a locking apparatus adapted for use with a truck trailer having a generally cylindrical king-pin characterized by an annular groove extending around its outer surface. The locking apparatus includes a generally cylindrical walled portion forming a cup which fits over the king-pin in a co-axial manner such that the cup encloses that portion of the king-pin having the annular groove. The cup has a slot which extends transversely in the walled portion of the cup and which is registerable with the annular groove when the cup is positioned over the king-pin.

The locking apparatus also includes a latch which is hingedly supported on the outside of the cup and adjacent the slot so that the latch is rotatable into and out of registry with the slot. When the cup is positioned over the king-pin, the latch can be rotated into registry with the slot and into engagement with the groove in the king-pin, thereby preventing removal of the cup from the king-pin.

The locking apparatus further includes locking means for selectively locking the latch into engagement with the king-pin. The locking means includes a hole in the end of the latch. The locking means also includes a lock member on the outside of the cup with a hole registerable with a hole in the latch member when the latch member is engaged with the annular groove. The locking means also includes a locking mechanism such as a padlock having a shackle which extends through the holes in the latch and the lock member, thereby securing the latch into engagement with the annular groove.

One of the features of the invention is the provision of a simply designed locking apparatus which effectively prevents the unauthorized coupling of a truck tractor and trailer. The cylindrical cup adapted to house the king-pin and the latch member adapted to selectively engage the annular grove provide a simple construction which, in combination with a standard padlock, provides effective protection against the unauthorized coupling of a king-pin with a fifth-wheel. The invention thus provides a construction which has a relatively simple design and is relatively inexpensive to produce and which provides effective protection from theft of the truck trailer.

Various other features and advantages of the invention will become apparent to those skilled in the art upon review of the following detailed description, claims and drawings.

DESCRIPTION OF THE DRAWINGS

FIG. 1 is a perspective view, partially broken away, of a truck tractor and trailer having a standard fifth wheel/king-pin tractor-trailer coupling.

FIG. 2 is perspective view of a locking apparatus embodying the invention and a king pin in partial section.

FIG. 3 is a plan view of the locking apparatus illustrated in FIG. 2.

FIG. 4 is a sectional side elevation view taken along line 4—4 showing the locking apparatus in a locked position around a king pin.

Before one embodiment of the invention is explained in detail, it is to be understood that the invention is not limited in its application to the details set forth in the following description or illustrated in the drawings. The invention is capable of other embodiments and of being practiced or carried out in other ways. Also, it is to be understood that the phraseology and terminology used herein is for the purpose of description and should not be regarded as limiting.

DESCRIPTION OF THE PREFERRED EMBODIMENT

FIG. 1 illustrates a truck tractor 2 and a trailer 3 having a standard tractor-trailer coupling. Located on the truck tractor 2 is a fifth wheel 4 which is characterized by a groove or set of jaws 5 which open to the rear of the truck tractor 2. The standard coupling also includes a generally cylindrical king pin 6 which extends downwardly from a fifth wheel plate (not shown) which is located on the trailer 3. The king pin 6, as better illustrated in FIG. 2, is characterized by a reduced diameter portion or annular groove 7 which extends around the circumference of the king pin 6, and which is adapted to be received by the jaws 5 on the fifth wheel 4.

A lock apparatus 10 adapted for use with a king pin 6 is illustrated in FIG. 2. The lock apparatus 10 includes a cup 18 having a generally cylindrical wall portion 20 having an axis 21 and, when placed over the king pin 6 in a co-axial manner, as shown in FIG. 4, defines a protective enclosure for the king pin 6, including that portion of the king pin having the annular groove 7. In the preferred embodiment, the cup is manufactured of a rigid, impact resistant material such as steel. The cup 18 has a transversely extending slot 22 in the cylindrical wall 20. The slot 22 is located in the wall portion 20 so that when the cup 18 is placed over the king-pin 6 in a generally co-axial manner, as shown in FIG. 4, the slot 22 is registerable with the annular groove 7 in the king pin 6. In the illustrated embodiment, the cup 18 includes a generally circular plate 23 positioned on the end of the cylindrical wall portion so that the cup 18 completely encloses the king pin 6.

The cup 18 has a first ear 24 connected to the outer surface of the cylindrical wall 20. Preferably, the first ear 24 is made of steel or a like material and is welded to the outer surface of the cup 18. In the preferred embodiment, the first ear 24 is adjacent and spaced axially of the slot 22.

The lock apparatus 10 includes bar means 26 for selective engagement with the annular groove 7. In the preferred embodiment, the bar means 26 includes a latch member 28 having a first end 30 and a second end 32. The second end 32 has a hole 34 therein. As shown in FIG. 3, the body of the latch member 28 extending between the first and second ends, 30,32 is generally straight and has a uniform width which is less than the width of groove 7 and slott 22 so that latch 28 can move into and out of registry in groove 7 and slot 22. In the preferred embodiment, the bar means is constructed of a material similar to that of the cup means.

The lock apparatus 10 also includes hinge means 36 for pivotal support of the bar means 26 such that the latch member 28 is rotatable between a first open position and a second locked position. In the preferred embodiment, the hinge means 36 is located on the first ear 24 and supports the first end of the latch member 28. Referring to FIG. 3, the latch member 28 is represented in the open position by the ghost lines and is spaced from the slot 22 such that the latch member 28 is not engaged with the annular groove 7. In the locked position, the latch member 28 is in registry with the slot 22 and engages the annular groove 7. As shown in FIG. 3, when the latch member 28 is in the locked position, the latch member 28 occupies and extends from the slot 22.

The lock apparatus 10 also includes lock means 38 for selectively locking the bar means 26 in the locked position, thereby preventing removal of the cup 18 from the king-pin 6. The lock means 38 includes a lock member 40 fixed to the cup 18 and registerable with the bar means 26 when the bar means 26 is in the locked position. In the preferred embodiment, the lock member 40 is a second ear 42 connected to the outside of the cup 18 located adjacent to the slot 22 and spaced axially and circumferentially of the slot 22. The second ear 42 is preferably made of steel or some like material and is welded to the outside of the cup 18. The second ear 42 has a hole 44 therein registerable with the hole 34 in the second end 32 of the latch member 28 when the latch member 28 is in the locked position. The lock means 38 also includes a lock mechanism 46 selectively engagable with the bar means 26 and the lock member 40. In the preferred embodiment, the lock mechanism 46 includes a padlock 48 having a shackle 50 adapted to be received by the hole 34 in the second end 32 of the latch member 28, when the latch member 28 is in the locked position, and the hole 44 in the second ear 42.

In order to prevent damage to the fifth-wheel of a truck caused by an unintentional attempted engagement between a fifth-wheel and a king-pin enclosed by a lock apparatus, the lock apparatus also includes warning means for alerting the driver of a truck that a lock apparatus is positioned over the king-pin. In the preferred embodiment, the warning means is in the form of a generally triangular or diamond-shaped pendant suspended from the bottom of the cup by a length of chain. The chain should be of sufficient length to allow the driver of a tractor to view the pendant dangling below the trailer. Also, the pendant should be painted or made of a material which has an attention-drawing color.

Various features of the invention are set forth in the following claims:

I claim:

1. A lock apparatus adapted for use with a fifth wheel plate having a king pin, the king pin characterized by a portion having a reduced diameter, the lock apparatus comprising cup means for providing a protective enclosure of the king pin and extending over the reduced diameter portion, said cup means including slot means registerable with the reduced diameter portion, bar means for selective engagement with the reduced diameter portion, said bar means having a movable, generally straight body having a generally uniform width less than the width of said slot and said reduced diameter portion, hinge means for pivotal support of said body of said bar means such that said bar means is movable between a first open position and a second locked position, said hinge means supported by the cup means, said body, when said bar means is in said second position, being housed in said slot means and extending into said reduced diameter portion, and lock means for selectively locking said bar means in the locked position, said lock means including a lock member fixed to said cup means and registerable with said bar means when said bar means is in said locked position, said lock means including a locking mechanism selectively engagable with said bar means and said lock member.

2. A lock apparatus as set forth in claim 1 wherein said bar means comprises a latch member having a first end pivotally supported by said hinge means and a second end having a hole therein registerable with said lock member.

3. A lock apparatus as set forth in claim 2 wherein said cup means comprises a generally cylindrical walled portion, and wherein said slot means includes a slot cut transversely of said cylindrical walled portion, and wherein said hinge means and said lock member are adjacent said slot.

4. A lock apparatus as set forth in claim 3 wherein said lock member is an ear connected to said cup and spaced axially of and adjacent to said slot.

5. A lock apparatus as set forth in claim 4 wherein said lock member has a hole therein registerable with said hole in said latch member when said latch member is in said locked position, and wherein said lock mechanism includes a shackle housably received by said hole in said lock member and said latch member hole.

6. A lock apparatus as set forth in claim 5 wherein said lock mechanism is a padlock.

7. A lock apparatus adapted for use with a fifth wheel plate having a king pin, the king pin characterized by an annular groove, the lock arrangement comprising a cup adapted to enclose the king pin extending over the annular groove and including a generally cylindrical walled portion having an axis and a slot extending transversely of the cylinder and registerable with the annular groove, a first ear connected to and extending laterally from the outside of said cylindrical wall portion, said first ear being spaced axially of and adjacent to said slot and a second ear integrally formed on the outside of the cylindrical wall portion, the second ear being spaced axially of the slot, spaced circumferentially of the slot, and adjacent the slot, the second ear having a hole therein, a hinge supported by said first ear, a latch member having a first end pivotally supported by the hinge such that said latch member is rotatable between a locked position wherein said latch member is engaged with the annular groove and an open position wherein said latch member is spaced from said slot, said latch member including a second end having a hole therein registerable with said hole in said second ear when said latch member is in said locked position and a generally straight body extending between said first and second ends, said body having a uniform width less than the width of said slot and said groove to fit into said slot and said annular groove when the latch member is in said locked position, and a padlock for selectively locking said latch to said second ear, said padlock having a shackle adapted to be received by said hole in said latch member and said hole in said second ear.

* * * * *